(12) United States Patent
Blinn et al.

(10) Patent No.: US 10,135,903 B2
(45) Date of Patent: Nov. 20, 2018

(54) GAME FOR GUESSING WHETHER A NAME IS REGISTERED OR AVAILABLE FOR REGISTRATION

(71) Applicant: Go Daddy Operating Company, LLC, Scottsdale, AZ (US)

(72) Inventors: Arnold Neil Blinn, Hunts Point, WA (US); Harsh Abhay Damania, Tempe, AZ (US); Anna Elizabeth Goodman, Lisle, IL (US); Rebekah Gruver, El Paso, TX (US); Aubrey John Russell, San Luis Obispo, CA (US); Brett Michael Spradling, Tempe, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 362 days.

(21) Appl. No.: 14/924,236

(22) Filed: Oct. 27, 2015

(65) Prior Publication Data

US 2017/0118172 A1    Apr. 27, 2017

(51) Int. Cl.
| | |
|---|---|
| *H04L 29/08* | (2006.01) |
| *H04L 12/58* | (2006.01) |
| *H04L 29/12* | (2006.01) |
| *G06Q 10/10* | (2012.01) |

(52) U.S. Cl.
CPC ............. *H04L 67/02* (2013.01); *G06Q 10/10* (2013.01); *H04L 51/32* (2013.01); *H04L 61/302* (2013.01); *H04L 61/3025* (2013.01); *H04L 61/1511* (2013.01)

(58) Field of Classification Search
CPC ..... G06Q 10/10; H04L 51/32; H04L 61/1511; H04L 61/302; H04L 61/3025
See application file for complete search history.

(56) References Cited

U.S. PATENT DOCUMENTS

| | | | | |
|---|---|---|---|---|
| 2012/0084281 | A1* | 4/2012 | Colosi | H04L 29/12632 707/723 |
| 2014/0304505 | A1* | 10/2014 | Dawson | G06F 21/6227 713/165 |
| 2016/0055490 | A1* | 2/2016 | Keren | G06Q 30/00 705/14.47 |

\* cited by examiner

*Primary Examiner* — Davoud A Zand

(74) *Attorney, Agent, or Firm* — Quarles & Brady LLP

(57) ABSTRACT

A game is provided that may be run on a client device of a customer. The game identifies one or more registered domain names and generates one or more available domain names for use in the game. In preferred embodiments, all of the registered and available domain names are linked in some manner to the customer and/or are in one or more categories selected by the customer. The domain names may be displayed one at a time and in a mixed order to the customer. The customer may guess whether each displayed domain name is registered or available for registration. The customer may be provided the correct answer after each guess and a "Results" page may display the results of all of the customer's guesses. The customer may be given the option at various points in the game to register any of the displayed and guessed upon available domain names. After registering one or more of the available domain names, the customer may be taken back into the game at the same point the customer left the game.

18 Claims, 11 Drawing Sheets

Application Screen 120 or Webpage Rendering 115

Incorrect robotsofthefuture.computer # is not registered

| Next Domain Name |

| Register Domain Name |

| Save as Favorite |

| Share on Social Media |

| Quit |

Application Screen 120 or Webpage Rendering 115

Correct utensils.info # is registered

| Next Domain Name |

| Share on Social Media |

| Quit |

Application Screen 120 or Webpage Rendering 115

Incorrect utensils.info # is registered

| Next Domain Name |

| Share on Social Media |

| Quit |

Application Screen 120 or Webpage Rendering 115

| | Results | | |
|---|---|---|---|
| X | utensils.info | | Share Save |
| O | chefschool.net | | Share Save |
| O | fastfood.info | | Share Save |
| X | biotech.com | | Share Save |
| O | robotsofthefuture.computer | Buy | Share Save |
| O | starwarslaserdefense.co | Buy | Share Save |
| O | apples.com | | Share Save |
| O | fastfood.com | | Share Save |
| O | latestcancertherapy.net | Buy | Share Save |
| O | beverages.info | | Share Save |

Main Menu

Start Over

Quit

FIG. 9

GAME FOR GUESSING WHETHER A NAME IS REGISTERED OR AVAILABLE FOR REGISTRATION

FIELD OF THE INVENTION

The present invention generally relates to a game allowing a customer to guess one at a time whether each name in a plurality of names is registered or available for registration and allowing the customer to register any available names in the plurality of names.

SUMMARY OF THE INVENTION

The present invention provides systems and methods for providing an educational guessing game that helps customers learn which names are likely to be registered and which names are likely to be available for registration. The education guessing game may be programmed as an application or as a webpage file that is transmitted by a Distributor (such as a Registrar or a third party acting for the Registrar) for domain names), to a client device.

The guessing game may be used for any system that requires a unique name, handle or identifier of varying quality and desirability. As non-limiting examples, the invention may be used for Twitter handles, email names on a given email platform, user names for an application or a service, phone numbers, license plates and domain names. For purposes of explaining the invention, the non-limiting example of using domain names in the game will be used, while it should be understood that other names, handles or identifiers in other systems may also be used in other embodiments of the invention.

While the domain names used in the game may be unrelated to the customer, in preferred embodiments, the identified registered domain names and the generated available domain names are related, tied or linked in some manner to the customer. In addition, the identified registered domain names and the generated available domain names may fall into zero, one, two or more categories selected by the customer on the client device.

The game may be played with the customer guessing whether a domain name is registered or available for any number of domain names. The customer may select a number of domain names for the game, the game may have a predetermined number for the game or the game continues until the customer selects to stop or quit. In a preferred embodiment, there are 10 domain names for the customer to review and guess upon each game.

The Registrar may access an electronic database of registered domain names to identify a plurality of registered domain names. In a preferred embodiment, the registered domain names are related to the customer and/or any selected categories.

The Registrar may generate a plurality of available domain names. The Registrar may use a domain name spinner to generate the domain names. In a preferred embodiment, the available domain names are related to the customer and/or any selected categories.

The Registrar may transmit over the computer network to the client device the registered domain names (preferably related to the customer and/or any selected categories) and the available domain names (preferably related to the customer and/or any selected categories).

The application or the webpage file may display, one at a time and in a mixed and/or random order, the registered domain names and the available domain names to the customer on a display of the client device.

The customer may guess using the client device whether each displayed domain name in the plurality of registered domain names and each domain name in the plurality of available domain names, one domain name at a time, is registered or available for domain name registration after being displayed.

After the customer has guessed, an application screen 120 or webpage rendering may be displayed informing the customer of whether the customer guessed correctly or incorrectly. Regardless of whether the customer guessed correctly or incorrectly, the customer may be given an option to select an available domain name for domain name registration after being guessed upon by the customer using the client device.

The customer may also be given an option to save the guessed upon domain name in a database that may later be accessed by the customer to review an possibly register one or more of the favorite available domain names. Registered and available for registration domain names may be saved as favorites or in some embodiments only available domain names may be saved and later reviewed as favorites.

The customer may also be given an option to send a message to one or more social media platforms regarding the game or one or more domain names in the game.

After a predetermined number of domain names have been presented and guessed upon by the customer or the customer selects to stop or quit the game, a "Results" page may be displayed on a display of the client device to the customer showing which domain names were guessed as registered or available for domain name registration correctly and incorrectly.

The "Results" page may also allow the customer to save one or more domain names (preferably only available domain names) to the favorites stored in a database by the Registrar.

The "Results" page may also allow the customer to send a message to one or more social media platforms regarding the game or one or more domain names in the game.

The "Results" page may also allow the customer to select one or more available domain names (not registered domain names) to be registered to the customer.

The Registrar, upon receiving notice from the client device that the customer desires to register one or more available domain names, may register the one or more available domain names to the customer. The Registrar may allow the domain names to be controlled and managed from an account of the customer.

The above features and advantages of the present invention will be better understood from the following detailed description taken in conjunction with the accompanying drawings.

BRIEF DESCRIPTION OF THE DRAWINGS

FIG. 9 is an application screen or a webpage rendering showing the results of the game that may be displayed at the end of the game (which may be after a predetermined number of domain names have been guessed upon, such as 10) or the customer has selected to stop the game. From this application screen or webpage rendering the customer may go to a main menu, start a new game, start a domain name registration process for any of the available domain names, save one or more of the domain names as a favorite and/or share one or more of the domain names on one or more social media platforms or quit the game.

DETAILED DESCRIPTION

Figure 1:
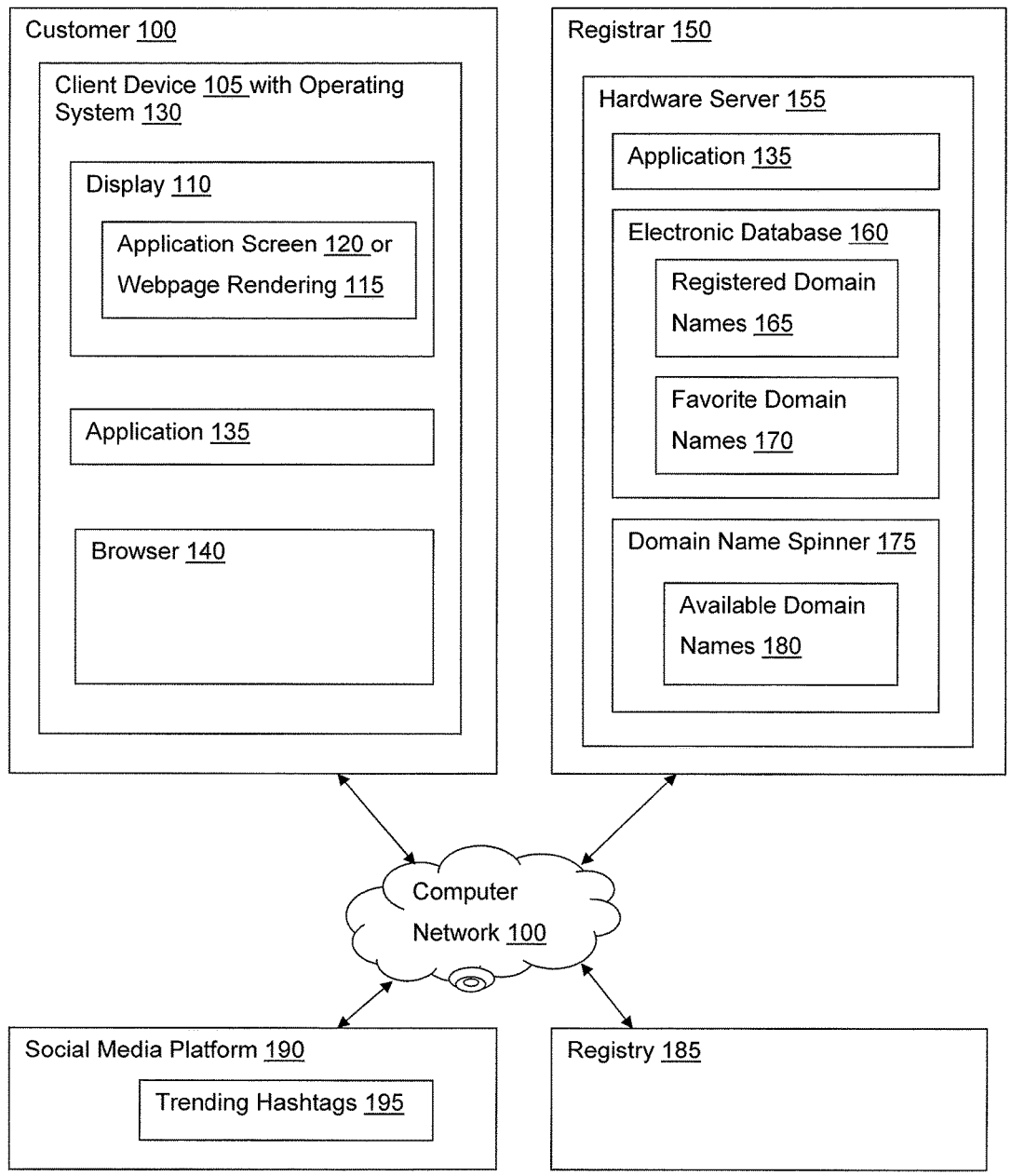
FIG. 1 is a block diagram illustrating the various parts and systems of the present invention.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram that illustrates, as non-limiting examples, various parts and systems that may be used to practice the present invention. Different embodiments may include structures and actions from one or more of a customer 100, a Registrar 150, a social media platform 190 and/or a Registry 185.

While FIG. 1 is specific for a guessing game using domain names, the guessing game may be used for any system that requires a unique name, handle or identifier of varying quality and desirability. As non-limiting examples, the invention may be used for Twitter handles, email names on a given email platform, user names for an application or a service, phone numbers, license plates and domain names. The parts and systems for other embodiments may be changed as needed. As a specific example, if the game is being played using license plates, the client device 105 may be in communication with a Department of Motor Vehicles (DMV) or an agent or proxy of the DMV instead of the Registrar.

For purposes of explaining the invention, the non-limiting example of using domain names in the game will be used, while it should be understood that other names, handles or identifiers in other systems may also be used in other embodiments of the invention.

The arrows between the customer 100, the Registrar 150, the social media platform 190 and the computer network 100 represent one or more computer networks, such as the Internet. The communications between the customer 100, the Registrar 150, the social media platform 190 and the computer network 100 may use any currently known or developed in the future methods or protocols. As non-limiting examples, communications over the Internet may be in Transmission Control Protocol (TCP) and Internet Protocol (IP) and webpages may be transmitted in hyper-text markup language (HTML).

A computer network 100 is a collection of links and nodes (e.g., multiple computers and/or other devices connected together) arranged so that information may be passed from one part of the computer network 100 to another over multiple links and through various nodes. Non-limiting examples of computer networks 100 include the Internet, the public switched telephone network, the global Telex network, an intranet, an extranet, a local-area network, a wide-area network, wired networks and wireless networks.

The Internet is a worldwide network of computers and computer networks arranged to allow the easy and robust exchange of information between computer users (who could be customers 100) on client devices 105 and websites hosted on servers. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related webpages. Websites, unless very large and complex or have unusual traffic demands, typically reside on a single server and are prepared and maintained by a single individual or entity (although websites residing on multiple servers are also becoming increasingly common). Menus, links, tabs, etc. may be used to move between different web pages within the website or to move to a different website.

Websites may be created using HyperText Markup Language (HTML) to generate a standard set of tags that define how the webpages for the website are to be displayed (a webpage rendering). Users of the Internet may access content providers' websites using software known as an Internet browser 140, such as Microsoft Internet Explorer, Google Chrome, Mozilla Firefox and Apple Safari. After the browser 140 has located the desired webpage, the browser 140 requests and receives information from the webpage, typically in the form of an HTML document, and then displays the webpage rendering 115 for the user on the user's client. The user then may view other webpage renderings at the same website or move to an entirely different website using the browser 140.

The Internet user may use a client device 105, such as, as non-limiting examples, a smartphone, PDA, tablet, laptop computer, or desktop computer to access a website via a computer network 100, such as the Internet.

The website may have a plurality of webpages and be hosted or operated from one or more servers. The servers may be, as a non-limiting example, one or more Dell PowerEdge(s) rack server(s), HP Blade Servers, IBM Rack or Tower servers, although other types of servers, combinations of one or more servers, server software and applications may also be used.

Browsers 140 are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser 140 is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "Registry" 185) for maintaining an authoritative source for the registered domain names 165 within a Top-Level Domain (TLD) and their corresponding IP addresses. For certain TLDs (e.g., .biz, .info, .name, and .org) the Registry 185 is also the authoritative source for contact information related to the domain name and is referred to as a "thick" Registry 185. For other TLDs (e.g., .com and .net) only the domain name, registrar identification, and name server information is stored within the Registry 185, and a Registrar 150 is the authoritative source for the contact information related to the domain name. Such Registries are referred to as "thin" Registries. Most gTLDs are organized through a central domain name Shared Registration System (SRS) based on their TLD.

Registries, Registrars 150 and client devices 105 are hereby defined to be machines that comprise physical devices, such as, as non-limiting examples, one or more hardware servers 155, computers, displays, microprocessors, microcontrollers, power supplies, routers, electro-mechanical databases, cases and/or cables. While software may run on the physical devices of a Registry 185, a Registrar 150 or a client device 105, the Registry 185, Registrar 150 and client device 105 are hereby defined to not be purely software.

The process for registering a domain name with .com, .net, .org, and some other TLDs allows an Internet user to use an ICANN-accredited Registrar 150 to register their domain name. For example, if an Internet user, John Doe, wishes to register the domain name "mycompany.com," John Doe may initially determine whether the desired domain name is available by contacting a domain name Registrar 150. The Internet user may make this contact using the Registrar's webpage and typing the desired domain name into a field on the Registrar's webpage created for this purpose. Upon receiving the request from the Internet user, the Registrar 150 may ascertain whether "mycompany.com" has already been registered by checking the SRS database associated with the TLD of the domain name or by checking with the Registry 185. The results of the search then may be displayed on the webpage rendering to thereby notify the Internet user of the availability of the domain name. If the domain name is available, the Internet user may proceed with the registration process. If the domain name is not available for registration, the Internet user may keep selecting alternative domain names until an available domain name is found.

An application 135 (also known as an "app" or an "application software") is hereby defined to be a computer program written in a programming language that is compatible with a mobile operating system 130 that runs on a client device 105, such as a smartphone, tablet or laptop computer. As non-limiting examples, a client device 105 may run the operating systems 130 of Apple iOS4 (common for iPhones), Google Lollipop and Android Android M (common for Android smartphones). Also, as non-limiting examples, applications 135 intended to run on a Apple's iOS4 operating system 130 may be written in objective-C and applications 135 intended to run on an Android operating system 130 may be written in a Java programming language. The mentioned operating systems 130 and programming languages for the applications 135 are merely examples and are not intended to limit the invention, as new operating systems and programming languages are constantly being updated or new ones are created to provide additional capabilities and features.

A webpage file (also known as a web file or a software program) is hereby defined to be a computer program written in a programming language that is compatible with an operating system 130 that runs on a client device 105, such as a desk top computer. As non-limiting examples, a client device 105 may run the operating systems 130 of Microsoft Windows or Apple OS X Yosemite. Also, as non-limiting examples, webpage files may be written in Hypertext Markup Language (HTML), HTML5, CSS and/or Javascript. The mentioned operating systems 130 and programming languages for the webpage file are merely examples and are not intended to limit the invention, as new operating systems and programming languages are constantly updated or new ones are created to provide additional capabilities and features.

Applications 135 may be preinstalled or downloaded to the client device 105, typically over a computer network 100. Applications 135 may be available through application distribution platforms that are typically operated by the owner of the mobile operating system 130, such as the Apple App Store, Google Play, Windows Phone Store, and BlackBerry App World. Some applications 135 are free, while others must be bought. Applications 135 may be downloaded from the application distribution platform to a client device 105 (which may be a smartphone, tablet, laptop or desktop computer).

Figure 10:
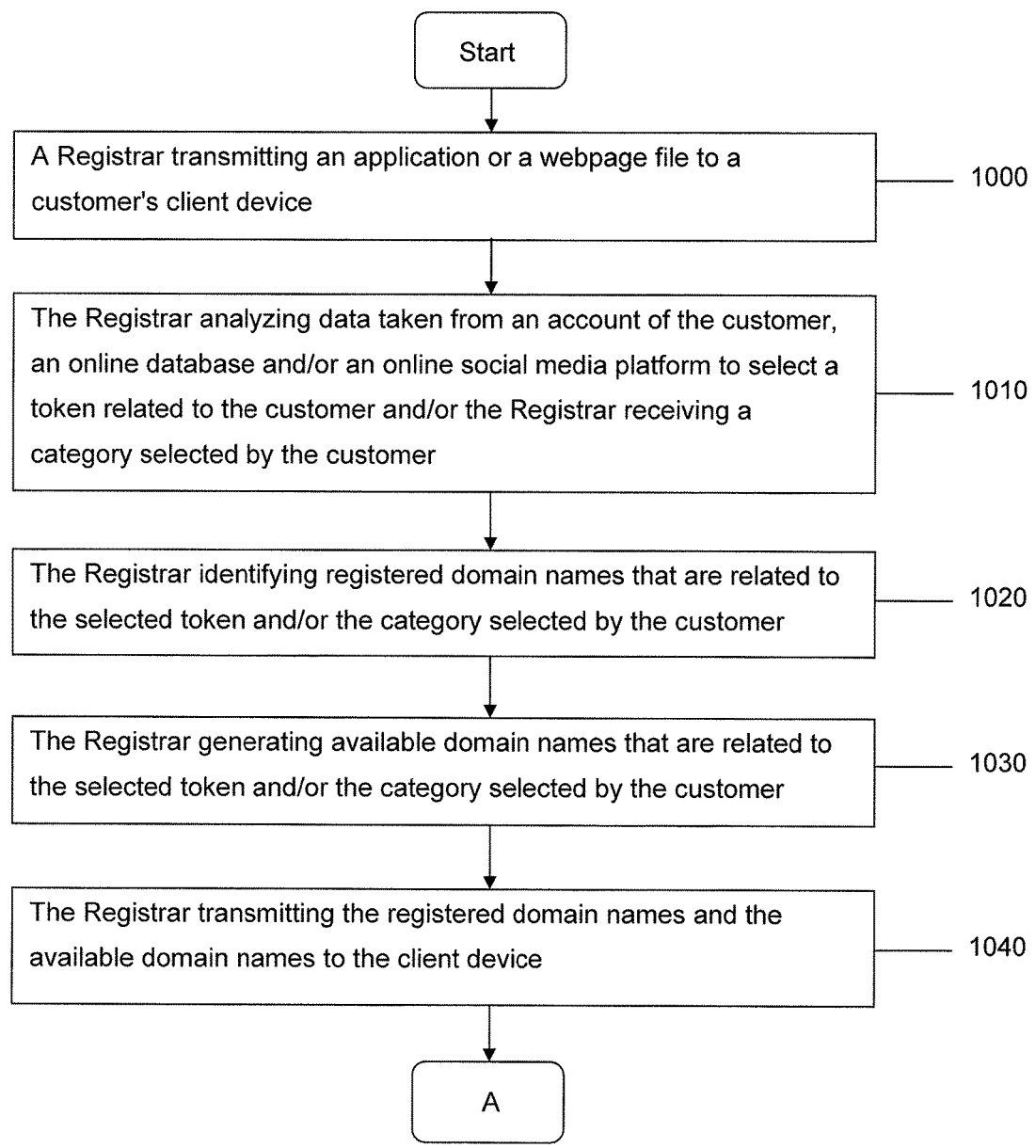
FIG. 10 is a flow chart illustrating non-limiting example steps that may be performed as part of a game of guessing whether a domain name is registered or available, i.e., unregistered and allowing a customer to register the available domain names.
Figure 11:
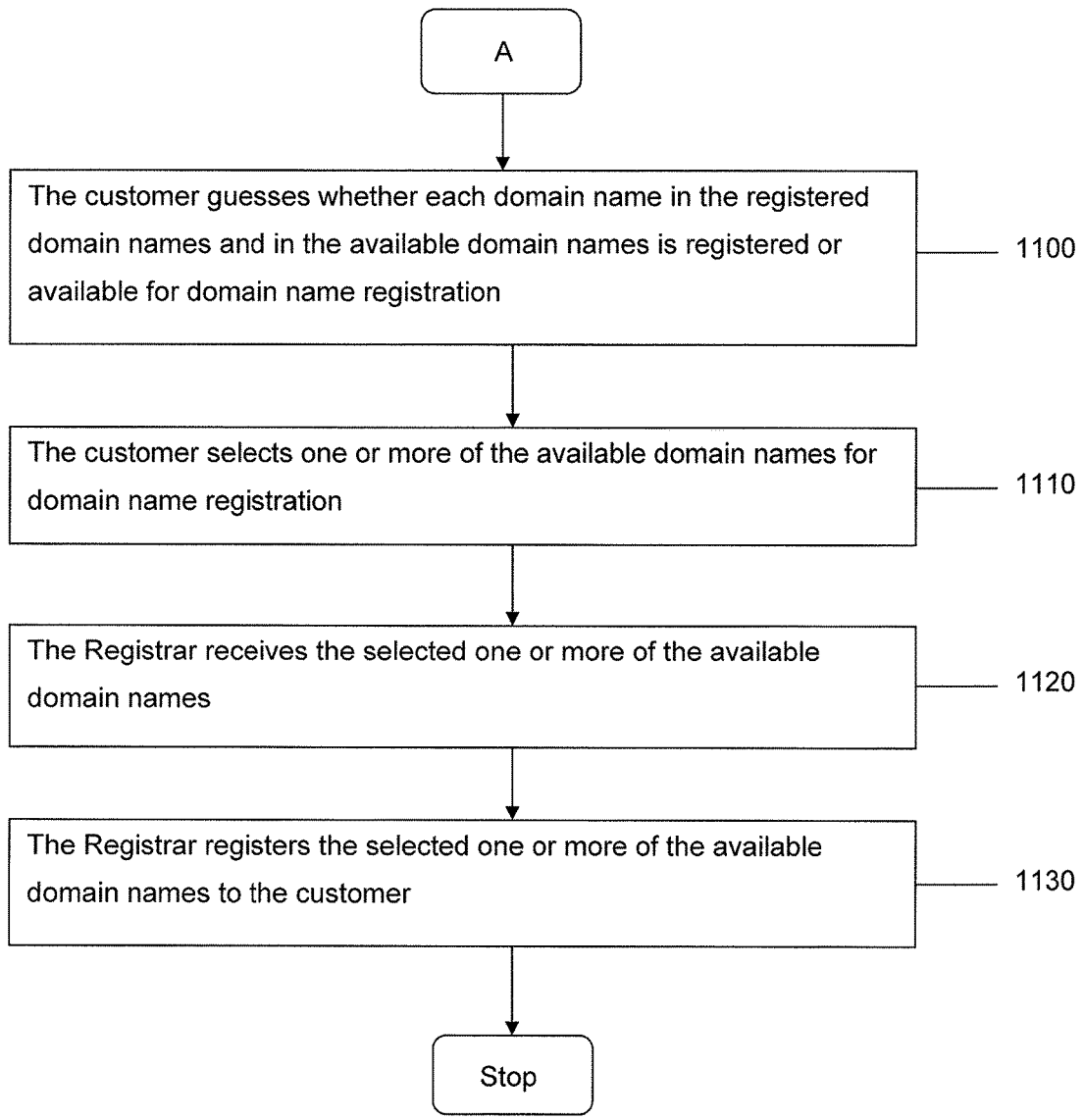
FIG. 11 is a continuation flow chart of FIG. 10 illustrating non-limiting example steps that may be performed as part of a game of guessing whether a domain name is registered or available, i.e., unregistered and allowing a customer to register the available domain names.

With reference to FIGS. 10 and 11, an embodiment of practicing the invention will now be discussed. A Registrar 150 may design an application 135 that helps a customer 100 learn which domain names are likely to be registered and which domain names are likely to be available for registration. The application 135 may also allow the customer 100 to select, if desired, one or more categories from which the registered and available domain names are chosen that are used in the game. The application 135 may also allow the customer 100 to register one or more available domain names used in the game. The Registrar 150 may store a copy of the application 135 in one or more databases operating on one or more hardware servers 155 that are part of the Registrar 150 (which would include leased infrastructure). The Registrar 150 may also store a copy of the application 135 with a third party distributor that may distribute the application 135 to one or more client devices 105 operated by one or more corresponding customers 100.

Figure 2:
FIG. 2 is an application screen or a webpage rendering that may be used to start a new game in a method of practicing the invention.

In an example embodiment, the customer 100 may select the application 135 and the Registrar 150 (either directly or via the third party distributor) may download the application 135 onto the client device 105, i.e., the Registrar 150 may transmit over a computer network 100 the application 135 configured to be run on the client device 105 operated by the customer 100 of the Registrar 150. The customer 100 may then select the application 135 to start the game. The application 135 may display an application screen 120 as shown in FIG. 2.

In another example embodiment, the customer 100, using a browser 140 on the client device 105, may visit a website operated by the Registrar 150. The customer 100 may select to play the game from the website and the Registrar 150 may download a webpage file to be run on the browser 140 of the client device 105. The webpage file may display a webpage rendering 115 as shown in FIG. 2. (Step 1000)

In response to either the customer 100 starting the game via the application 135 or via the webpage file, the Registrar 150 may select and use any desired registered and/or available domain names 180 to play the game. In some embodiments, the domain names may be unconnected and unrelated to the customer 100. In these embodiments, purely random registered and available domain names 180 may be selected as part of the game.

However, in preferred embodiments, the registered and/or available domain names 180 are: 1) related in some manner to the customer 100 and/or 2) the customer 100 has selected one, two or more categories from which to select the registered and the available domain names 180.

Any desired method may be used to determine domain names that are related in some manner to the customer 100. As non-limiting examples, information from a customer account, previously registered domain names, published websites of the customer 100, online databases with data associated with the customer 100 and/or social media platforms 190 with data associated with the customer 100 may be analyzed or parsed to select one or more tokens that are related in some manner to the customer 100. As non-limiting examples, each token in the one or more tokens may be a word or phrase found in the data or a synonym, antonym, category and/or in the same category as the word or the phrase found in the data.

Figure 3:
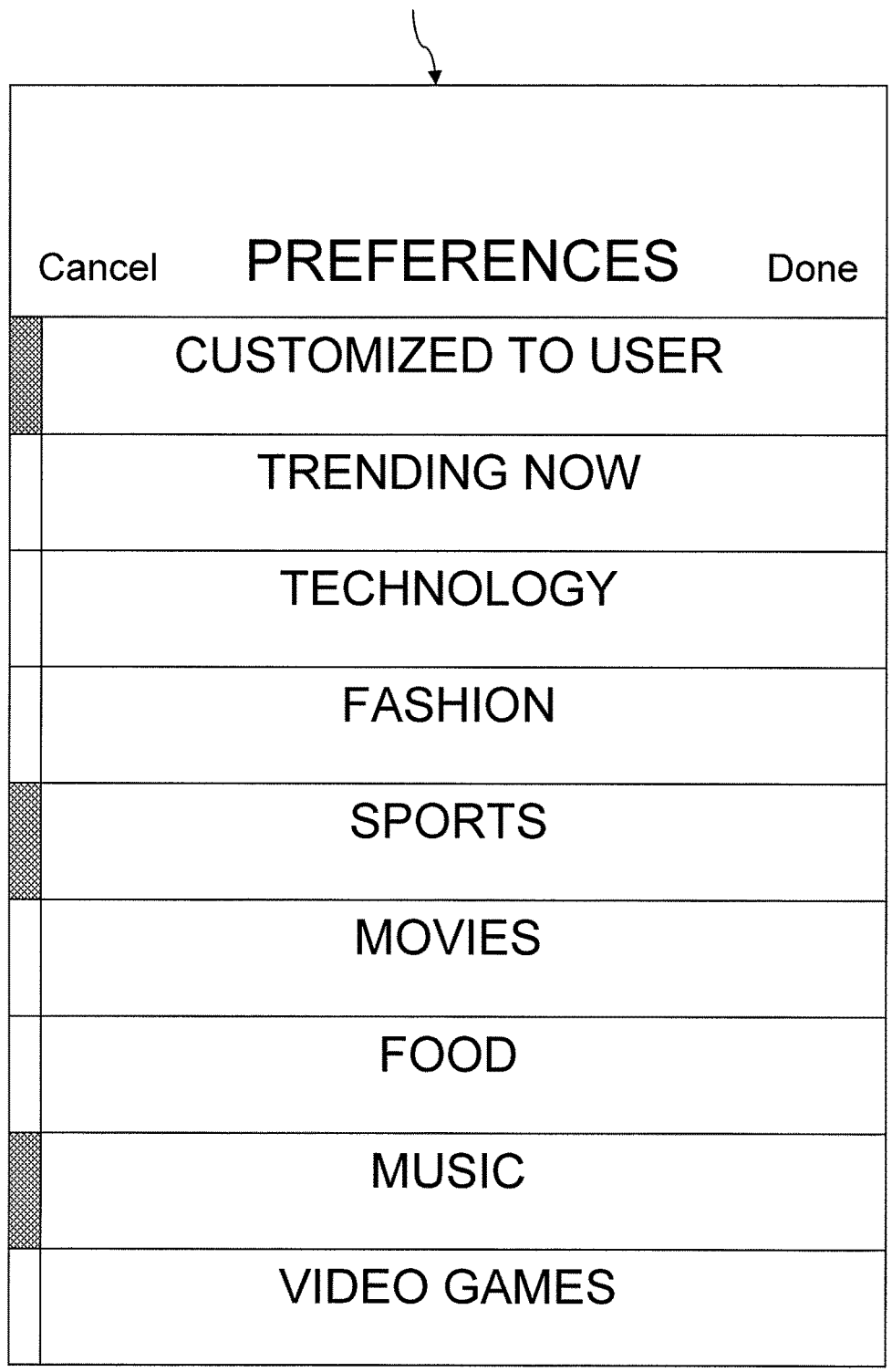
FIG. 3 is an application screen or a webpage rendering displayed on a client device that may be used by a customer to select one or more categories from which to select the registered domain names and the generated available domain names that the customer will guess whether each of the domain names (in random and/or mixed order) are registered or available.

Any desired method may be used to allow the customer 100 to select zero, one, two or more categories from which the Registrar 150 is to select the registered and available domain names. As one non-limiting example, the application 135 or webpage file may display the application screen 120 or the webpage rendering 115 shown in FIG. 3 to the customer 100 on a display 110 of the client device 105. From the application screen 120 or the webpage rendering 115, the customer 100 may select zero, one, two or more of the options or categories from which the Register may select domain names that are registered and available for registration. In FIG. 3, the customer 100 selected to have domain names: 1) customized to the customer 100, 2) related to sports and 3) related to music. In FIG. 3, the customer 100 did not select to have domain names that are: 1) trending now, 2) related to technology, 3) related to fashion, 4) related to movies, 5) related to food or 6) related to video games. The selected categories (or non-selected categories) may be indicated by any desired method, such as by highlighting, coloring and/or shading. FIG. 3 illustrates an example of a far left tip of the selected categories "Customized to User," "Sports" and "Music" having a colored section. The Registrar 150 may receive over the computer network 100 a zero, one, two or more selected categories by the customer 100 from the application 135 running on the client device 105. (Step 1010)

If one of the selected categories by the customer 100 is current events, illustrated as "Trending Now" in FIG. 3, one or more trending hashtags 195 from one or more social media platforms 190 may be determined and tokenized by the Registrar 150. The Registrar 150 may use the trending hashtags 195 and/or tokens in accessing the electronic database 160 to identify the registered domain names 165 that are related to the selected category and used in generating the available domain names 180. Alternatively, or in addition, the "Trending Now" category may include any trend on any social media platform. As non-limiting examples, the "Trending Now" category may include Twitter trends, keywords from one or more news feeds and/or curated by humans on the backend.

The game may have the customer 100 guess whether any desired number of domain names are registered or available for domain name registration. As a non-limiting example, the game may display on a display 110 of the client device 105, all at once or one at a time, 10 different domain names for the customer 100 to guess as being either registered or available for registration. While the number of registered domain names 165 does not have to equal the number of available domain names 180, in preferred embodiments, the number of registered domain names 165 equals or is close to the number of available domain names 180. In some embodiments, 50% of the guessed upon domain names may be registered while 50% of the guessed upon domain names may be available for domain name registration. Of course, the game is not limited to 10 different domain names as any number of domain names may be used as part of the game. In addition, the customer 100 may play the game any number of times. In one possible embodiment, the customer 100 may select the number of domain names from which to guess. In another possible embodiment, the customer 100 may receive an endless stream of domain names so that the customer 100 may play as long as desired and/or until the customer 100 selects a "Quit" option.

In the embodiments where the domain names are unconnected and unrelated to the customer 100, the Registrar 150 may identify registered domain names 165 and generate available domain names 180 by any desired method.

In the embodiments where the registered and/or available domain names 180 are desired to be either related in some manner to the customer 100 and/or the customer 100 has select one, two or more categories from which to select the registered and available domain names 180, the Registrar 150 preferably selects registered domain names 165 and generates available domain names 180 accordingly using any desired method.

In some embodiments, the Registrar 150 may already have information or data connected or related to the customer 100. As non-limiting examples, the Registrar 150 may have strongly authenticated the customer, possibly using account names and passwords although any other desired method may also be used, the Registrar 150 may know the customer 100 and the customer's preferences, behaviors and actions from previously playing the game or from the customer 100 previously visiting (possibly even as a customer) the Registrar's website.

As a non-limiting example of identifying registered domain names 165 linked to the customer 100, the Registrar 150 may access an electronic database 160 of registered domain names 165 to identify one or more registered domain names 165 that are related in some manner to the customer 100 and/or the customer 100 selected categories. The Registrar 150 may use the one or more tokens previously determined using words from the customer account, words in domain names previously registered to the customer 100, words in published or unpublished websites of the customer 100, words from online databases tied to the customer 100 and/or words from social media platforms 190 tied to the customer 100 to try to match the tokens with strings of characters in previously registered domain names 165 of third party domain name registrants. (Step 1020)

As a non-limiting example of generating available domain names 180 linked to the customer 100, the Registrar 150 may comprise a domain name spinner 175. The Registrar 150 may use the one or more tokens previously determined using words from the customer account, words in domain names previously registered to the customer 100, words in published or unpublished websites of the customer 100, words from online databases tied to the customer 100 and/or words from social media platforms 190 tied to the customer 100. The domain name spinner 175 may generate one or more domain names that include one or more of the tokens.

The Registrar 150 may then confirm that each of the generated domain names is actually available. Generated domain names that turn out to be registered may become one of the registered domain names or may be discarded. (Step 1030) In the rare instance when the customer 100 is the registrant of one of the displayed registered domain names, the game may, as non-limiting examples: 1) take no special action, 2) display a notice on the client device informing/confirming to the customer 100 that the customer 100 is the registrant of the domain name, 3) cause the customer 100 to immediately "win" the game or 4) grant some other prize or benefit to the customer 100 such as one or more free and/or discounted products or services from the Registrar's website.

The Registrar 150 may transmit over the computer network 100 to the client device 105 the identified registered domain names (preferably associated or linked to the customer 100) and the generated available domain names 180 (also, preferably associated or linked to the customer 100) all at once or as the domain names are needed during the game. (Step 1040)

Figure 4:
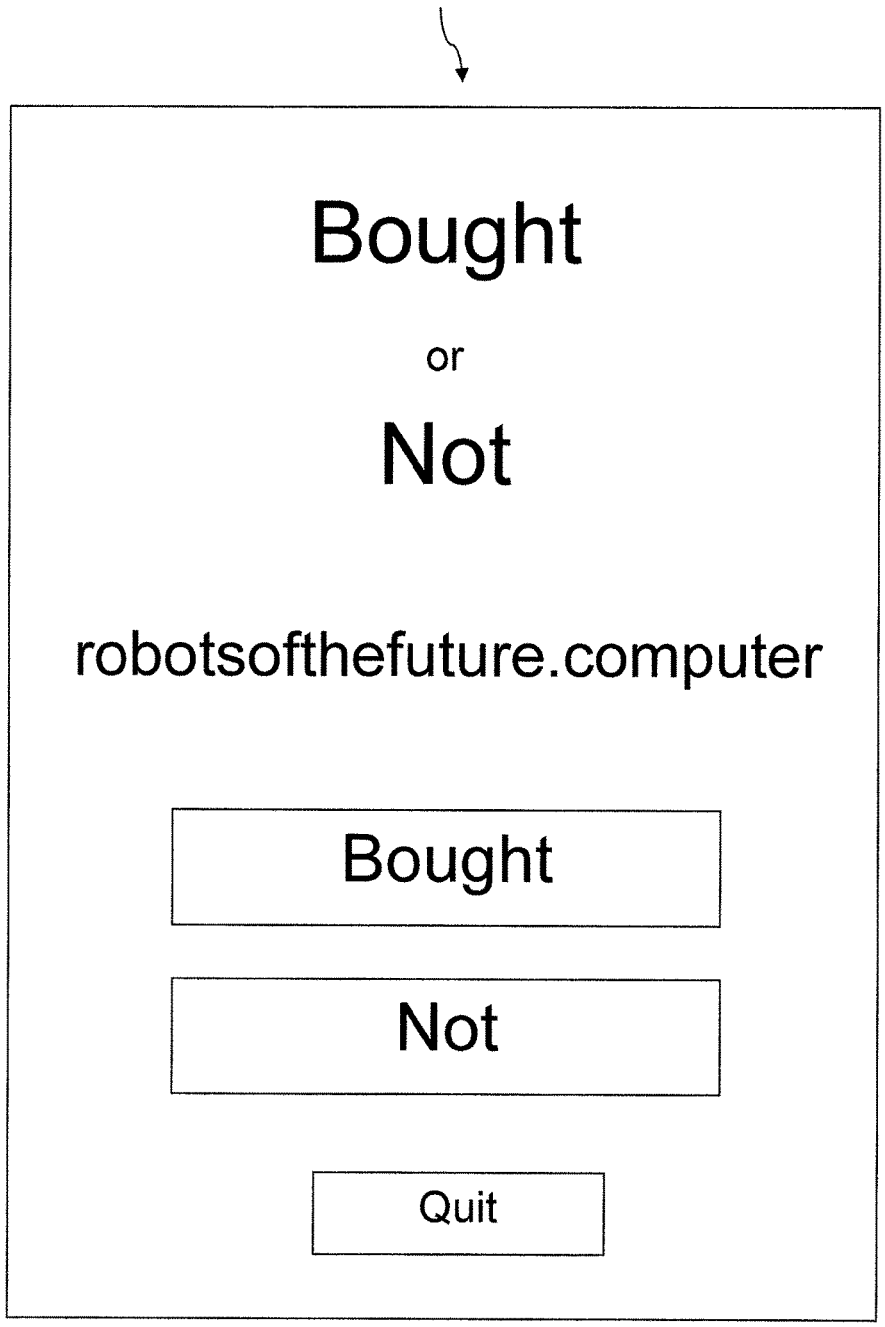
FIG. 4 is an application screen or a webpage rendering that may be displayed as part of the game to allow a customer to guess whether a domain name is bought, i.e., registered, or not, i.e., available for domain name registration, or quit the game.

The application 135 or the webpage file may display, all at once or one at a time, the identified registered domain name(s) and the generated available domain name(s) on the display 110 of the client device 105. The identified registered domain names and the generated available domain names 180 are preferably randomly mixed together so that the customer 100 cannot detect a pattern that reveals whether any particular displayed domain name is registered or available for domain name registration. FIG. 4 illustrates a possible application screen 120 or a possible webpage rendering 115 that may be displayed on a display 110 of the client device 105 to the customer 100 to allow the customer 100 to guess whether the displayed domain name is registered or available for domain name registration. (Step 1100)

As a specific example, FIG. 4 displays the domain name "robotsofthefuture.computer" and allows the customer 100 to guess (select) "Bought" (meaning the customer 100 believes the domain name is already registered), "Not" (meaning the customer 100 believes the domain name is available for domain name registration) or "Quit" to stop the game.

Figure 5:
FIG. 5 is an application screen or a webpage rendering that may be displayed as part of the game to notify the customer when the customer has guessed correctly that a domain name is not registered. The customer may continue with the game, start a domain name registration process for the available domain name (and then continue with the game), save the domain name as a favorite (and then continue with the game) and/or share the domain name on a social media platform (and then continue with the game) or quit the game.

For this example, "robotsofthefuture.computer" is to be considered available for registration. If the customer 100 guesses "Not," i.e., the customer 100 correctly guessed that the domain name "robotsofthefuture.computer" is available for domain name registration, then the customer 100 may be shown an application screen 120 or a webpage rendering 115 stating the customer 100 is correct. FIG. 5, shows such an application screen 120 or webpage rendering 115. In this example, the application screen 120 or the webpage rendering 115 illustrated in FIG. 5 allows the customer 100 to select: 1) Next Domain Name, which will continue on with the game to another domain name for the customer 100 to guess as to whether the domain name is registered or available for domain name registration; 2) Register Domain Name, which may allow the customer 100 to register the displayed domain name and then return to the game; 3) Save as Favorite, which may store the displayed domain name in a database 160 that the customer 100 may access later to then register (or not) the domain name (the database 160 storing domain names identified by the customer 100 as a favorite domain name may be stored on the client device 105 or on an electronic database stored and maintained at the Registrar 150); 4) Share on Social Media, which may then allow the customer 100 to select a social media platform 190 and enter a message that will be sent to the social media platform 190; or 5) Quit, which will stop the game and may take the customer 100 to a results page.

Figure 6:
FIG. 6 is an application screen or a webpage rendering that may be displayed as part of the game to notify the customer when the customer has guessed incorrectly that a domain name is registered when the domain name is in fact not registered. The customer may continue with the game, start a domain name registration process for the available domain name (and then continue with the game), save the domain name as a favorite (and then continue with the game) and/or share the domain name on a social media platform (and then continue with the game) or quit the game.

If the customer 100 guesses "Bought," i.e., the customer 100 incorrectly guessed that the domain name "robotsoftthefuture.computer" is registered, then the customer 100 may be shown an application screen 120 or a webpage rendering 115 stating the customer 100 is incorrect. FIG. 6, shows such an application screen 120 or webpage rendering 115. In this example, the application screen 120 or the webpage rendering 115 illustrated in FIG. 6 allows the customer 100 to select: 1) Next Domain Name, which will continue on with the game to another domain name for the customer 100 to guess as to whether the domain name is registered or available for domain name registration; 2) Register Domain Name, which may allow the customer 100 to register the displayed domain name and then return to the game; 3) Save as Favorite, which may store the displayed domain name in a database 160 that the customer 100 may access later to then register (or not) the domain name; 4) Share on Social Media, which may then allow the customer 100 to select a social media platform 190 and enter a message that will be sent to the social media platform 190; or 5) Quit, which will stop the game and may take the customer 100 to a results page.

Figure 7:
FIG. 7 is an application screen or a webpage rendering that may be displayed as part of the game to notify the customer when the customer has guessed correctly that a domain name is registered. The customer may continue with the game and/or share the domain name on a social media platform (and then continue with the game).

As another example, the domain name "utensils.info" (replacing the domain name "robotsoftthefuture.computer") may be displayed on the application screen 120 or webpage rendering 115 illustrated in FIG. 4. In this example, "utensils.info" is to be considered a registered domain name. If the customer 100 guesses "Bought," i.e., the customer 100 correctly guessed that the domain name "utensils.info" is a registered domain name, then the customer 100 may be shown an application screen 120 or a webpage rendering 115 stating the customer 100 is correct. FIG. 7, shows such an application screen 120 or webpage rendering 115. In this example, the application screen 120 or the webpage rendering 115 illustrated in FIG. 7 allows the customer 100 to select: 1) Next Domain Name, which will continue on with the game to another domain name for the customer 100 to guess as to whether the domain name is registered or available for domain name registration; 2) Share on Social Media, which may then allow the customer 100 to select a social media platform 190 and enter a message that will be sent to the social media platform 190; or 3) Quit, which will stop the game and may take the customer 100 to a results page.

Figure 8:
FIG. 8 is an application screen or a webpage rendering that may be displayed as part of the game to notify the customer when the customer has guessed incorrectly that a domain name is not registered when the domain name is in fact registered. The customer may continue with the game and/or share the domain name on a social media platform (and then continue with the game) or quit the game.

If the customer 100 guesses "Not," i.e., the customer 100 incorrectly guessed that the domain name "utensils.info" is an available domain name for domain name registration, then the customer 100 may be shown an application screen 120 or a webpage rendering 115 stating the customer 100 is incorrect. FIG. 8, shows such an application screen 120 or webpage rendering 115. In this example, the application screen 120 or webpage rendering 115 illustrated in FIG. 8 allows the customer 100 to select: 1) Next Domain Name, which will continue on with the game to another domain name for the customer 100 to guess as to whether the domain name is registered or available for domain name registration or 2) Share on Social Media, which may then allow the customer 100 to select a social media platform 190 and enter a message that will be sent to the social media platform 190; or 3) Quit, which will stop the game and may take the customer 100 to a results page.

In alternative embodiments, any or all of the described application screens 120 or the webpage renderings 115 in FIGS. 5-8 may also display an option (not shown in FIGS. 5-8) that the customer 100 may select to see and/or register similar domain names to the guessed upon domain name. This selection of this option by the customer 100 may: 1) trigger the application to display similar available domain names to the customer 100 that the customer 100 may register or 2) have a link that directs the customer 100 to a website of the Registrar 150 that may display similar available domain names to the customer 100 that the customer 100 may register.

As an example, when "utensils.info" was the most recently displayed guessed upon domain name, the customer may select an option to see and register similar available domain names. As non-limiting examples, domain names such as "silverware.info," "tool.com" and "device.info" (assuming these domain names are available) may be displayed to the customer 100 on the client device 105 for selection and domain name registration.

As previously stated, any number of available and/or registered domain names may be presented to the customer 100 as described above to allow the customer 100 to guess whether a displayed domain name is registered or available for domain name registration. In a preferred embodiment, a predetermined number of domain names (both registered and available for domain name registration), such as 10, may be displayed to the customer 100 as part of the game.

After a predetermined number (such as 10) of domain names (registered and/or available for domain name registration) have been guessed upon by the customer 100 or the customer 100 selects "Quit" on one of the application screens 120 or webpage renderings 115, the game may be stopped and a Results application screen 120 or webpage rendering 115 may be displayed to the customer 100. As a non-limiting example, FIG. 9 shows an example of a Results application screen 120 or webpage rendering 115. The Results application screen 120 or webpage rendering 115 preferably lists, as non-limiting examples: 1) each domain name guessed upon by the customer 100; 2) whether the customer 100 was correct (indicated by a "0" in FIG. 9) for each domain name; 3) whether the customer 100 was incorrect (indicated by a "X" in FIG. 9) for each domain name; 4) an icon that provides an option or ability to "Buy" each domain name that was presented and is available, whether the customer 100 was correct or incorrect; 5) an icon that provides an option or ability to "Share" on one or more social media platforms 190 the domain name and/or comments from the customer 100 regarding the domain name; 6) an icon to share overall results for any number of guesses or any number of games on one or more social media platforms; 7) an icon that provides an option or ability to "Save" each domain name in a database 160 stored in the client device 105 and/or by the Registrar 150 so that the customer 100 may be reminded of one or more favorite domain names 170 for later registration of those saved favorite domain names 170; 8) an icon that provides an option or ability to "Start Over" to start another game for the customer 100 and 9) an icon that provides an option to "Quit" the game. In some embodiments, an application screen 120 or webpage rendering 115 may be displayed to the customer 100 that allows the customer 100 to select one or more of the guessed upon registered domain names so that the customer 100 may see available domain names that are similar to the registered domain names selected by the customer 100.

The application screens 120 or webpage renderings 115 in FIGS. 5 and 6 allow the customer 100 to select an available domain name for domain name registration. FIG. 9 (the Results application screen 120 or webpage rendering 115) allows the customer 100 to select one or more available domain names for domain name registration. (Step 1110) Selecting one or more available domain names may activate a link to connect the customer 100 to a Registrar website so that the customer may register the selected one or more available domain names. In this manner, the Registrar 150 may receive one or more selected available domain names from the application 135 or the webpage files running on the client device 105 that the customer 100 desires to register. (Step 1120) The Registrar 150 may register the selected available domain names to the customer 100 and place the domain name(s) in a customer 100 account configured to be controlled and managed by the customer 100. (Step 1130) After terminating or completing the domain name registration process for the selected one or more available domain names, the customer 100 may be returned to the game at the point in which the customer 100 left the game.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method, comprising the steps of:
  transmitting over a computer network, by a Distributor comprising a hardware server, an application configured to be run on a client device operated by a customer of the Distributor;
  receiving over the computer network, by the Distributor, a selected category from the application, wherein the application running on the client device is configured to receive the selected category from the customer;
  accessing by the Distributor an electronic database to identify a plurality of registered names that are related to the selected category;
  generating by the Distributor a plurality of available names that are related to the selected category;
  transmitting over the computer network, by the Distributor, to the client device the plurality of registered names related to the selected category and the plurality of available names related to the selected category,
    wherein the application is configured to allow the customer to guess on the client device whether each name in the plurality of registered names and each name in the plurality of available names is registered or available for name registration after being displayed and
    wherein the application is configured to allow the customer to select one or more of the plurality of available names for name registration after being displayed from the client device;
  receiving over the computer network, by the Distributor, the selected one or more of the plurality of available names from the application running on the client device; and
  registering by the Distributor the selected one or more of the plurality of available names to the customer, wherein the selected category by the customer is current events and one or more trending hashtags from one or more social media platforms are tokenized and used in accessing by the Distributor the electronic database to identify the plurality of registered names that are related to the selected category and used in generating by the Distributor the plurality of available names that are related to the selected category.

2. The method of claim 1, wherein the Distributer is a domain name Registrar and the name is a domain name.

3. The method of claim 1,
  wherein the application running on the client device is configured to, immediately after the customer guesses whether a name in the plurality of available names is registered or available for name registration, present an option to the customer to register the name in the plurality of available names and
  wherein the application running on the client device is configured not to, immediately after the customer guesses whether a name in the plurality of registered names is registered or available for name registration, present an option to the customer to register the name in the plurality of registered names.

4. The method of claim 1, wherein the application running on the client device is configured to, immediately after the customer has guessed on all of the names in the plurality of registered names and the customer has guessed on all of the names in the plurality of available names, display on the client device a result table comprising:
  the plurality of registered names,
  the plurality of available names,
  an indication of whether the customer correctly or incorrectly guessed whether each name in the plurality of registered names and each name in the plurality of available names was registered or available for name registration,
  a displayed icon option for each name in the plurality of available names to register each name in the plurality of available names,
  a displayed icon option for each name in the plurality of available names and each name in the plurality of registered names to see and register similar domain names and
  no displayed icon option to register each name in the plurality of registered names.

5. The method of claim 1, wherein the application running on the client device is configured for receiving a favorite one or more names in the plurality of available names as identified by the customer and:
  i) transmitting over the computer network the favorite one or more names to the Distributor, and wherein the Distributor stores the favorite one or more names and data identifying the customer in an electronic database or
  ii) storing the favorite one or more names on the client device.

6. The method of claim 1, wherein the application running on the client device is configured for receiving a chosen social media platform and transmitting data over the computer network to the chosen social media platform, wherein the data is encoded with information as to whether the customer correctly or incorrectly guessed whether one or more of the names in the plurality of registered names and/or one or more of the name in the plurality of available names was registered or available for name registration.

7. A method, comprising the steps of:
  transmitting over a computer network, by a Distributor comprising a hardware server, an application configured to be run on a client device operated by a customer of the Distributor;

analyzing by the Distributor data taken from an account of the customer, an online database and/or an online social media platform to select a token related to the customer;

accessing by the Distributor an electronic database to identify a plurality of registered names that are related to the selected token;

generating by the Distributor a plurality of available names that are related to the selected token;

transmitting over the computer network, by the Distributor, to the client device the plurality of registered names related to the selected token and the plurality of available names related to the selected token, wherein the application is configured to allow the customer to guess on the client device whether each name in the plurality of registered names and each name in the plurality of available names is registered or available for name registration after being displayed and wherein the application is configured to allow the customer to select one or more of the plurality of available names for name registration after being displayed from the client device;

receiving over the computer network, by the Distributor, the selected one or more of the plurality of available names from the application running on the client device; and registering by the Distributor the selected one or more of the plurality of available names to the customer.

8. The method of claim 7, wherein the application is configured to display each name in the plurality of registered names and each name in the plurality of available names one at a time and in a mixed order to allow the customer to guess on the client device whether each name in the plurality of registered names and each name in the plurality of available names is registered or available for name registration.

9. The method of claim 7, wherein the Distributer is a domain name Registrar and the name is a domain name.

10. The method of claim 7, wherein the application running on the client device is configured to, immediately after the customer has guessed on all of the names in the plurality of registered names and the customer has guessed on all of the names in the plurality of available names, display on the client device a result table comprising:

the plurality of registered names,
  the plurality of available names,
  an indication whether the customer correctly or incorrectly guessed whether each name in the plurality of registered names and each name in the plurality of available names was registered or available for name registration,
  a displayed icon option for each name in the plurality of available names to register the each name in the plurality of available names and
  no displayed icon option to register each name in the plurality of registered names.

11. The method of claim 7, wherein the application running on the client device is configured for receiving a favorite one or more names in the plurality of available names as identified by the customer and i) transmitting over the computer network the favorite one or more names to the Distributor, and wherein the Distributor stores the favorite one or more names in an electronic database and associates the favorite one or more names with data identifying the customer or
  ii) storing the favorite one or more names on the client device.

12. The method of claim 7, wherein the application running on the client device is configured for receiving a chosen social media platform and transmitting data over the computer network to the chosen social media platform, wherein the data is encoded with information as to whether the customer correctly or incorrectly guessed whether one or more of the names in the plurality of registered names and/or one or more of the name in the plurality of available names was registered or available for name registration.

13. A method, comprising the steps of:

transmitting over a computer network, by a Distributor comprising a hardware server, a webpage file configured to display a webpage rendering on a client device operated by a customer of the Distributor;

receiving over the computer network, by the Distributor, a selected category from the client device, wherein the webpage rendering displayed on the client device is configured to receive the selected category from the customer;

accessing by the Distributor an electronic database to identify a plurality of registered names that are related to the selected category;

generating by the Distributor a plurality of available names that are related to the selected category;

transmitting over the computer network, by the Distributor, to the client device the plurality of registered names related to the selected category and the plurality of available names related to the selected category, wherein the webpage file is configured to allow the customer to guess on the webpage rendering displayed on the client device whether each name in the plurality of registered names and each name in the plurality of available names is registered or available for name registration after being displayed and wherein the webpage file is configured to allow the customer to select on the webpage rendering displayed on the client device one or more of the plurality of available names for name registration after being displayed;

receiving over the computer network, by the Distributor, the selected one or more of the plurality of available names from the webpage file running on the client device; and registering by the Distributor the selected one or more of the plurality of available names to the customer, wherein the selected category by the customer is current events and one or more trending hashtags from one or more social media platforms are tokenized and used in accessing by the Distributor the electronic database to identify the plurality of registered names that are related to the selected category and used in generating by the Distributor the plurality of available names that are related to the selected category.

14. The method of claim 13, wherein the webpage file is configured to display each name in the plurality of registered names and each name in the plurality of available names one at a time and in a mixed order on the webpage rendering to allow the customer to guess on the client device whether each name in the plurality of registered names and each name in the plurality of available names is registered or available for name registration.

15. The method of claim 13, wherein the webpage file running on the client device is configured to, immediately after the customer guesses whether a name in the plurality of available names is registered or available for name registration, present an option to the customer on the webpage rendering to register the name in the plurality of available names.

16. The method of claim 13, wherein the webpage file running on the client device is configured to, immediately after the customer has guessed on all of the names in the plurality of registered names and the customer has guessed on all of the names in the plurality of available names, display on the webpage rendering on the client device a result table comprising:

the plurality of registered names, the plurality of available names, an indication whether the customer correctly or incorrectly guessed whether each name in the plurality of registered names and each name in the plurality of available names was registered or available for name registration, a displayed icon option for each name in the plurality of available names to register the each name in the plurality of available names and no displayed icon option to register each name in the plurality of registered names.

17. The method of claim 13, wherein the webpage file running on the client device is configured for receiving a favorite one or more names in the plurality of available names displayed on the webpage rendering as identified by the customer and i) transmitting over the computer network the favorite one or more names to the Distributor, and wherein the Distributor stores the favorite one or more names and data identifying the customer in an electronic database or ii) storing the favorite one or more names on the client device.

18. The method of claim 13, wherein the Distributer is a domain name Registrar and the name is a domain name.

* * * * *